No. 882,233. PATENTED MAR. 17, 1908.
J. D. CALDWELL.
SHINGLE BUTT CUTTING MACHINE.
APPLICATION FILED AUG. 15, 1904.
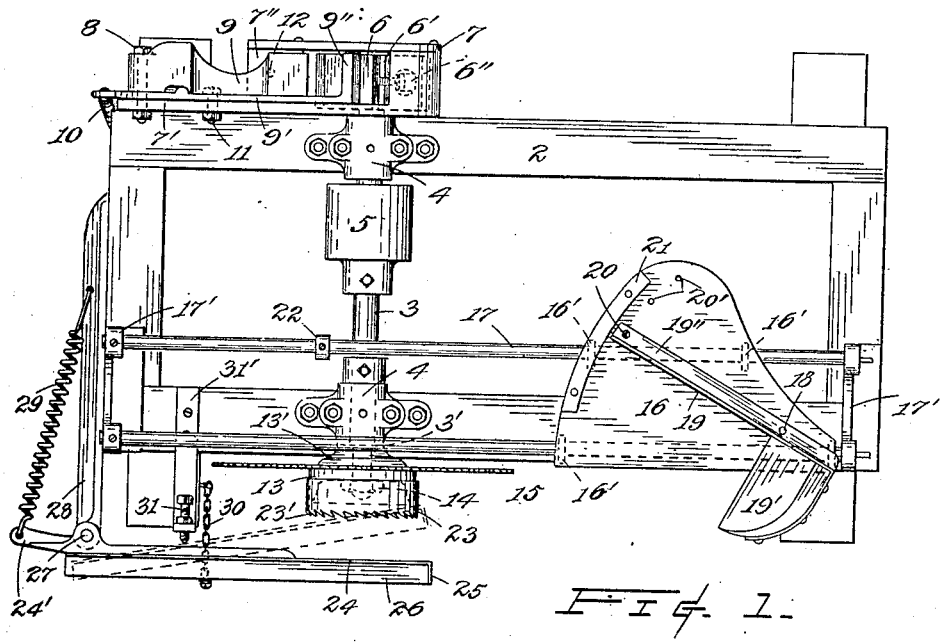
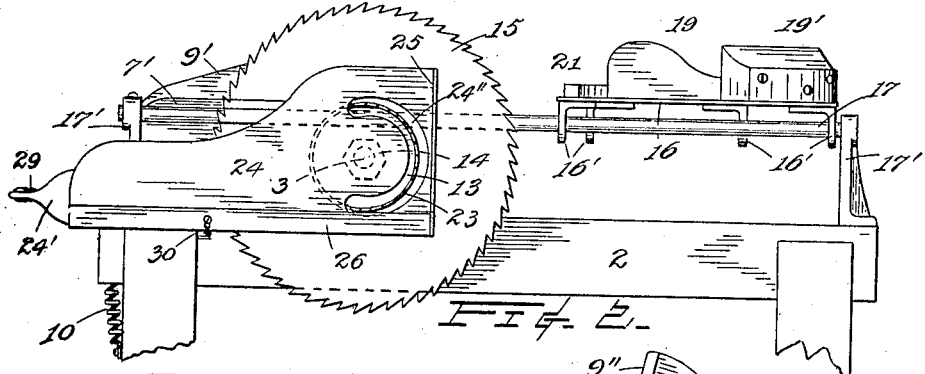
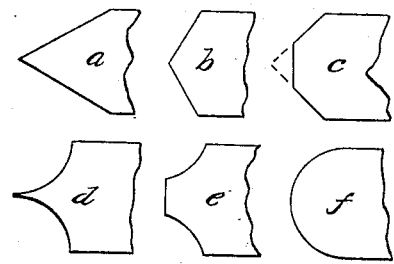
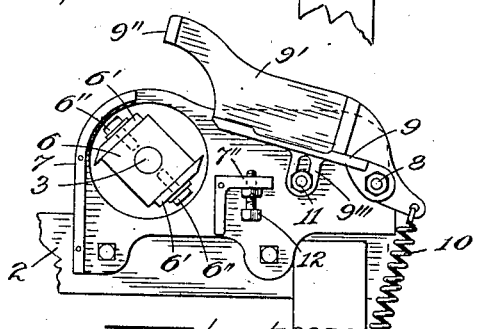
WITNESSES:
C. A. Bisbee
Dudley Moss.
INVENTOR.
J. D. Caldwell
BY
Pierre Barnes
ATTORNEY.
THE NORRIS PETERS CO., WASHINGTON, D. C.

UNITED STATES PATENT OFFICE.

JOHN DAVID CALDWELL, OF OLYMPIA, WASHINGTON, ASSIGNOR TO IVAN BUSHONG, OF SEATTLE, WASHINGTON.

SHINGLE-BUTT-CUTTING MACHINE.

No. 882,233.

Specification of Letters Patent.

Patented March 17, 1908.

Application filed August 15, 1904. Serial No. 220,154.

*To all whom it may concern:*

Be it known that I, JOHN DAVID CALDWELL, citizen of the United States, residing at Olympia, in the county of Thurston and State of Washington, have invented certain new and useful Improvements in Shingle-Butt-Cutting Machines, of which the following is a specification, reference being had therein to the accompanying drawing.
Figure 1 is a plan view of a machine embodying my invention. Fig. 2 is a side elevation thereof. Fig. 3 is a fragmentary side elevation of same taken oppositely to Fig. 2. Fig. 4 shows various styles of shingle-butts as cut by the machine.

My invention relates to improvements in shingle making machines and more especially to that class by which ornamental or "fancy" butts of shingles are formed.
The object of the invention is to construct a machine of this character wherein shingle-butts may be cut to various shapes with accuracy and uniformity, at small cost and at great despatch.
The invention consists in the novel construction and combination of parts as hereinafter particularly described and pointed out in the claims.

In said drawings, 2 indicates the frame-work of the machine, constructed in any suitable manner and size to receive the working parts thereof.

3 is an arbor journaled in boxes, such as 4, and carrying centrally of its length a pulley 5 in position to be connected by an endless belt with a driving pulley upon a power shaft.

A rotatable planer-head 6 is fixedly secured to one end of the arbor and is provided with cutting knives 6' which are secured by bolts 6'', as usual. The planer head projects interiorly of a casing 7 secured or provided at the outside of said frame-work and having pivoted thereto, as by a bolt 8, a tiltable table 9 which is connected, at some distance forward of the pivot, by a spring 10 to the frame-work so that the opposite end of the table will be held normally in its uppermost position. This table 9 is provided with a back plate 9' which terminates at its after end in an arm 9'' extending transversely above the planer head, and a portion of the back in proximity to said arm is cut away so as not to interfere with the revolving knives when this table is depressed to cut the shingles. The upward swing of the table is limited by a stop bolt 11 passing through a slotted lug 9''' of the table and the back of the casing 7; while its downward travel is adjustably regulated by a screw 12 extending through a shelf piece 7'' of the casing. By this mechanism, including the planer head with its cutters and the table, shingles placed edgewise upon the latter and pressed down can be cut to form the "cove" or "scallop" butts, indicated, respectively, by *d* and *e* in Fig. 4, according to the adjustment given by the aforesaid screw 12.

In proximity of the end of the arbor 3, opposite to the planer head, are collars 13 and 13' secured by a nut 14 acting upon the screw-threaded arbor-end to force the innermost one against an annular shoulder 3' of the arbor and furnishing means to rigidly secure a circular disk saw 15 thereto. This saw is used for cutting shingle butts to "diamond," "hectagon" or "octagon" shapes, *a*, *b* or *c*, in Fig. 4, as will now be described. A shingle carriage 16 is slidably connected, as by apertured pendent lugs 16', to longitudinal track-bars 17 supported by standards 17' secured to the ends of the frame work. Attached to the top of the carriage by a pivotal bolt 18 is a fence 19 which has a block 19' projecting rectangularly therefrom, and preferably of wood, against which the butts are placed; while one of the shingle sides rest against the fence and, when the carriage is thrust forward, the said saw will pass diagonally through the butt end of the shingle to remove a portion of the same. The carriage is then drawn back and the shingle turned over when, by again thrusting the carriage forward, the opposite side of the butt is formed to the desired shape. The different angles of cut to form the various shapes of butts last alluded to are attained by swinging the fence to the predetermined angle and securing the same in its adjusted position by a bolt 20 through a hole in the fence-flange 19'' and the proper one of a plurality of spaced holes 20' provided in the carriage bed. To compensate for the difference in thickness between the thin or "point" end and the thick or "butt" end of the shingles, we provide a strip 21 on the front end of the carriage in order to raise the point end of the shingle when laid there-across.

A collar 22 may advantageously be provided upon one of the track bars to intercept the forward travel of the carriage immediately after the saw has passed through the shingle. Fixedly secured to the outer collar 13 is a cylindrical saw 23 provided with the customary rim teeth 23' adapted to cut the shingle butts to the semi-circular or "half round" shape *f*, Fig. 4. To accomplish this cut, I provide a horizontally swinging shingle-holder comprised of a vertical plate 24 having an end abutment flange 25 and a shingle supporting ledge 26 along its lower edge. This holder is hinged by a pin 27 to an attachment 28 integrally secured to the front end of the machine frame and has a forwardly extending arm 24' which is connected by an extensible spring 29 to the frame or said attachment whereby the holder is normally retained at its outermost position.

The outer and inner swinging movement of this holder is respectively limited by a chain 30 connected at its ends to the holder and the machine frame, and an impinging screw 31 adjustable in a bent bar 31' of the frame.

The plate 24 is provided with a segmental aperture 24" located so that when the holder is pressed in against the opposing force of its spring to a position indicated by broken lines in Fig. 1 a half of the toothed rim of the cylindrical saw will protrude therethrough and, in consequence, a shingle carried by the holder will have its end cut to form the "half-round" butt.

The construction and operation of the invention is extremely simple and marks a decided advance over apparatus heretofore in use for forming fancy butts on shingles. The several parts may be operated individually or simultaneously by a number of operators and furthermore the shingles may be cut in multiple by each of the several described parts.

Having described my invention, what I claim as new and desire to secure by Letters Patent, is—

In a device of the class described, a supporting frame, standards spaced apart and extending above said frame, track bars arranged in parallel relation and supported at their ends in said standards, a shingle carriage slidably mounted upon said track bars, an arbor mounted for rotation on said frame and extending transversely of said track bar and between the frame and track bars, cutting devices carried by said arbor, a table swinging at one end from said frame, means for adjusting said table toward and away from said cutting devices, and means for regulating the movement of said table.

In testimony whereof I affix my signature in presence of two witnesses.

JOHN DAVID CALDWELL.

Witnesses:
A. G. COOK,
F. E. DILLE.